United States Patent
Kim et al.

(10) Patent No.: US 8,268,274 B2
(45) Date of Patent: *Sep. 18, 2012

(54) CATALYST COMBINATIONS AND METHODS AND SYSTEMS FOR OXIDIZING NITRIC OXIDE IN A GAS STREAM

(75) Inventors: Chang H Kim, Rochester, MI (US); David B. Brown, Brighton, MI (US); Wei Li, Troy, MI (US); Steven J. Schmieg, Troy, MI (US); Gongshin Qi, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/907,217

(22) Filed: Oct. 19, 2010

(65) Prior Publication Data
US 2011/0070139 A1 Mar. 24, 2011

Related U.S. Application Data

(63) Continuation-in-part of application No. 12/563,345, filed on Sep. 21, 2009, now Pat. No. 7,964,167.

(60) Provisional application No. 61/102,462, filed on Oct. 3, 2008.

(51) Int. Cl.
| | |
|---|---|
| *B01D 53/56* | (2006.01) |
| *B01D 53/94* | (2006.01) |
| *B01J 8/00* | (2006.01) |
| *B01J 8/02* | (2006.01) |
| *B01J 23/10* | (2006.01) |
| *B01J 23/58* | (2006.01) |
| *B01J 35/00* | (2006.01) |
| *F01N 3/28* | (2006.01) |

(52) U.S. Cl. ............... 423/213.2; 423/213.5; 423/213.7; 423/239; 423/DIG. 5; 423/DIG. 6; 422/105; 422/177; 422/180; 60/276; 60/299; 60/301; 502/525

(58) Field of Classification Search ............... 423/213.2, 423/213.5, 213.7, 239.1, DIG. 5, DIG. 6; 422/105, 177, 180; 60/276, 299, 301; 502/525
See application file for complete search history.

(56) References Cited

U.S. PATENT DOCUMENTS

| | | | |
|---|---|---|---|
| 4,001,371 A | 1/1977 | Remeika et al. | |
| 4,140,655 A * | 2/1979 | Chabot et al. | ........ 502/303 |
| 4,208,269 A * | 6/1980 | Gladrow et al. | ........ 208/120.1 |
| 4,921,829 A | 5/1990 | Ozawa et al. | |
| 5,185,311 A | 2/1993 | Tabata et al. | |
| 5,447,705 A | 9/1995 | Petit et al. | |
| 5,562,888 A | 10/1996 | Rajadurai | |
| 5,622,680 A | 4/1997 | Monceaux et al. | |
| 6,352,955 B1 | 3/2002 | Golden | |
| 6,616,904 B1 | 9/2003 | Becue et al. | |
| 6,919,047 B1 | 7/2005 | He et al. | |
| 7,247,258 B2 | 7/2007 | Jung et al. | |

(Continued)

FOREIGN PATENT DOCUMENTS
JP 6304449 A 11/1994
(Continued)

*Primary Examiner* — Timothy Vanoy
(74) *Attorney, Agent, or Firm* — BrooksGroup

(57) ABSTRACT

One embodiment of the invention may include a product comprising a catalyst combination comprising a perovskite catalyst and a second catalyst that is not a perovskite catalyst.

42 Claims, 2 Drawing Sheets

U.S. PATENT DOCUMENTS

| | | |
|---|---|---|
| 7,375,054 B2 | 5/2008 | Eguchi et al. |
| 7,514,055 B2 | 4/2009 | Golden |
| 7,641,875 B1 | 1/2010 | Golden |
| 2003/0198582 A1 | 10/2003 | Golden |
| 2004/0082469 A1* | 4/2004 | Gandhi et al. ................ 502/305 |
| 2005/0221979 A1* | 10/2005 | Matsuo et al. ................ 502/330 |
| 2007/0006578 A1 | 1/2007 | Tanaami et al. |
| 2007/0105715 A1 | 5/2007 | Suda et al. |
| 2010/0167920 A1* | 7/2010 | Uemura et al. ............... 502/327 |
| 2010/0209326 A1 | 8/2010 | Gandhi et al. |
| 2010/0233045 A1 | 9/2010 | Kim et al. |

FOREIGN PATENT DOCUMENTS

| | | |
|---|---|---|
| WO | 90/08589 A1 | 8/1990 |

* cited by examiner

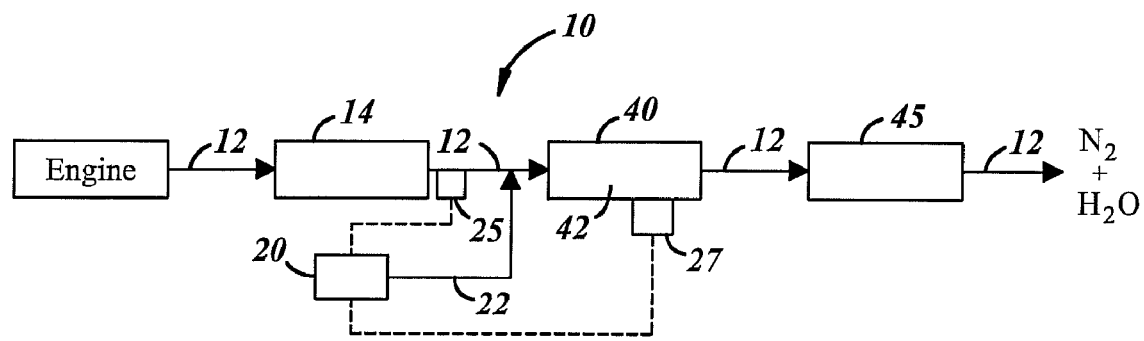
FIG. 1
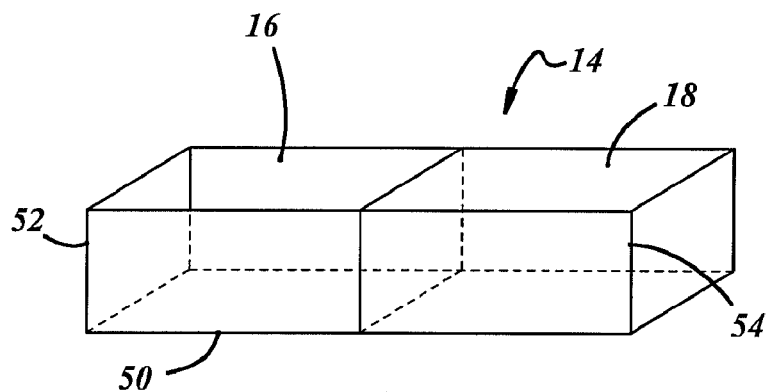
FIG. 2
Performance of Catalysts
| La | Sr | Co | Mn | Conversion at 325 °C (%) | S.A. (m²/g) |
|---|---|---|---|---|---|
| 1 | 0 | 1 | 0 | 79 | 10.6 |
| 1 | 0 | 1 | 0 | 78 | 66.4 |
| 0.9 | 0.1 | 1 | 0 | 86 | 20.4 |
| 0.8 | 0.2 | 1 | 0 | 84 | 34.7 |
| 0.7 | 0.3 | 1 | 0 | 79 | 12.4 |
| 1 | 0 | 0 | 1 | 70 | 7.4 |
| 1 | 0 | 0 | 1 | 62 | 11.3 |
| 0.9 | 0.1 | 0 | 1 | 64 | 14.5 |
| Commercial Platinum Catalysts | | | | 45 | - |
FIG. 3

CATALYST COMBINATIONS AND METHODS AND SYSTEMS FOR OXIDIZING NITRIC OXIDE IN A GAS STREAM

CROSS REFERENCE TO RELATED APPLICATIONS

This application claims the benefit of U.S. Provisional Application Ser. No. 61/102,462 filed Oct. 3, 2008; and is a Continuation-In-Part of U.S. Non-Provisional application Ser. No. 12/563,345 filed Sept. 21, 2009 which is now U.S. Pat. No. 7,964,167 issued Jun. 21, 2011. The benefit of the filing date thereof is hereby claimed.

TECHNICAL FIELD

The field to which the disclosure generally relates to includes catalyst combinations, and methods and systems for treating a gas stream.

BACKGROUND

A catalyst can be used to catalyze a reaction of components in a gas stream.

SUMMARY OF ILLUSTRATIVE EMBODIMENTS OF THE INVENTION

One embodiment of the invention may include a product comprising a catalyst combination comprising a perovskite catalyst and a second catalyst that is not a perovskite catalyst. In one embodiment, the perovskite catalyst may have the general formula $ABO_3$, $AA'BO_3$ $ABB'O_3$, $AA'BB'O_3$, or $AA'BB'O_3$. In another embodiment, the second non-perovskite catalyst may comprises at least one metal from the precious metal or noble metal group of the periodic table. In another embodiment, the second non-perovskite catalyst may comprise at least one of palladium, platinum, rhodium or ruthenium, or catalyst systems including the same. In one embodiment, a catalyst combination may include a perovskite catalyst and a second catalyst non-perovskite catalyst, the second catalyst non-perovskite catalyst have a loading of about 1-100 $g/ft^3$, 1-80 $g/ft^3$, 1-60 $g/ft^3$, 1-40 $g/ft^3$, 1-20 $g/ft^3$, or a loading within such ranges. In one embodiment of a catalyst combination comprising a second non-perovskite catalyst, the perovskite catalyst may have a loading ranging from 1 to 120 g/L, 1 to 80 g/L, 1 to 40 g/L, 1 to 20 g/L.

In one embodiment, a catalyst combination may include a perovskite catalyst and a second catalyst non-perovskite catalyst, wherein the second non-perovskite catalyst comprises platinum have a loading of about 1-60 $g/ft^3$, 1-40 $g/ft^3$, 1-20 $g/ft^3$, or a loading within such ranges. In one embodiment of a catalyst combination comprising platinum, the perovskite catalyst may have a loading ranging from 1 to 120 g/L, 1 to 80 g/L, 1 to 40 g/L, 1 to 20 g/L.

In one embodiment, a catalyst combination may include a perovskite catalyst and a second catalyst non-perovskite catalyst, wherein the second non-perovskite catalyst comprises palladium have a loading of about 5-100 $g/ft^3$, or 10-60 $g/ft^3$, or a loading within such ranges. In one embodiment of a catalyst combination comprising palladium, the perovskite catalyst may have a loading ranging from 1 to 120 g/L, 1 to 80 g/L, 1 to 40 g/L, 1 to 20 g/L.

One embodiment may include treatment of a gas stream that includes $NO_x$ with a perovskite catalyst having the general formula $ABO_3$, $AA'BO_3$ $ABB'O_3$, or $AA'BB'O_3$, in a catalytic oxidation reaction to oxidize nitric oxide in the gas stream.

In one embodiment, the perovskite catalyst of the general formula $ABO_3$ used in the oxidation reaction may be supported on any of a variety of substrates including, but not limed to, at least one of reactor packing structures and materials, beads, pellets, fluidized bed powders or other solid particulate material suspendable in a flow of gas, a flow-through monolith, a wall-flow monolith, a metal monolith, a ceramic monolith, metal or ceramic fabricated supports.

In one embodiment, the perovskite catalyst of the general formula $ABO_3$ used in the oxidation reaction may be not be supported by a substrate but may be formed into substrates having any of a variety of configurations including, but not limited to, flat panels, beads, pellets, or reactor packing material shapes.

Another embodiment may include a perovskite catalyst of the general formula $ABO_3$ in a catalytic oxidation reactor for oxidizing nitric oxide in an exhaust stream of a lean burning hydrocarbon fueled power source, wherein A represents a rare earth metal from the Lanthanide Series and/or an alkaline-earth metal, and wherein B represents a transition metal.

In another embodiment, the catalytic performance of the perovskite catalyst of the general formula $ABO_3$ as described above may be enhanced by the substitution of a small amount of a promoter material for a portion of at least one of element A or element B in the catalytic formulation.

Another embodiment may include an exhaust system for reducing $NO_x$ emissions including a catalytic oxidation reactor having the perovskite catalyst of the general formula $ABO_3$ or a modified formula of $ABO_3$ wherein a small amount of a promoter material is substituted for a portion of at least one of element A or element B.

Another embodiment may include a method of using a perovskite catalyst to oxidize nitric oxide in a gas stream.

Other illustrative embodiments of the invention will become apparent from the detailed description provided hereinafter. It should be understood that the detailed description and specific examples, while disclosing illustrative embodiments of the invention, are intended for purposes of illustration only and are not intended to limit the scope of the invention.

BRIEF DESCRIPTION OF THE DRAWINGS

Illustrative embodiments of the invention will become more fully understood from the detailed description and the accompanying drawings, wherein:

FIG. 1 is a schematic flow diagram of an exhaust system for a hydrocarbon fueled power source having a perovskite catalyst for oxidizing nitric oxide to nitrogen dioxide in accordance with an exemplary embodiment;

FIG. 2 is a close-up view of the catalytic oxidation reactor of FIG. 1;

FIG. 3 is a table describing the performance of the perovskite catalysts according to the exemplary embodiment in oxidizing nitric oxide versus a conventional platinum catalyst;

DETAILED DESCRIPTION OF EXEMPLARY EMBODIMENTS

Figure 4:
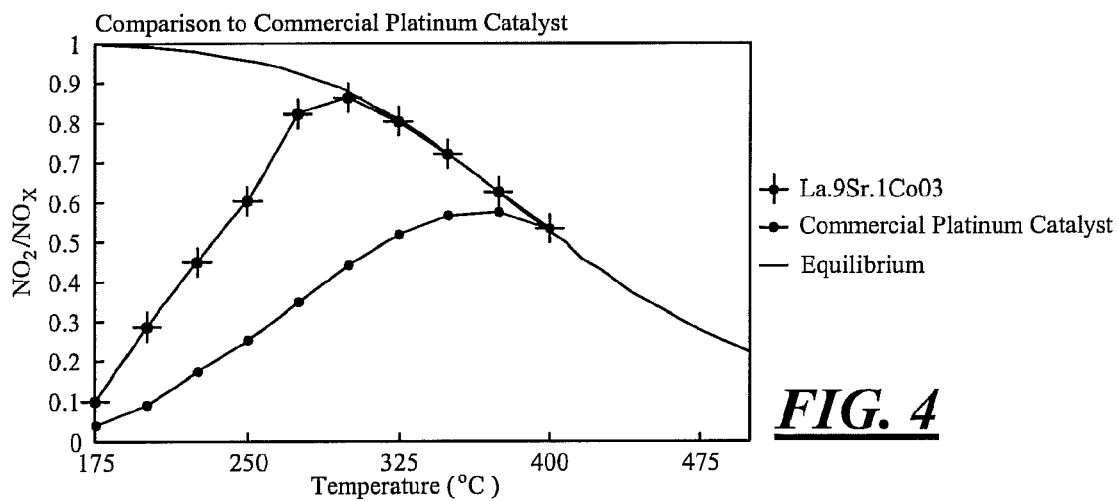
FIG. 4 is a graphical illustration of the nitric oxide oxidation performance of $LaCoO_3$ versus a commercial platinum NO oxidation catalyst over a wide range of temperatures.

The following description of the embodiment(s) is merely illustrative in nature and is in no way intended to limit the invention, its application, or uses.

One embodiment of the invention may include a catalyst combination of a perovskite catalyst and a second catalyst that is not a perovskite catalyst. In one embodiment, the perovskite catalyst may have the general formula $ABO_3$, $AA'BO_3$ $ABB'O_3$, or $AA'BB'O_3$. In another embodiment, the second non-perovskite catalyst may comprises at least one metal from the precious metal or noble metal group of the periodic table. in another embodiment, the second non-perovskite catalyst may comprise at least one of palladium, platinum, rhodium or ruthenium, or catalyst systems including the same. In one embodiment, a catalyst combination may include a perovskite catalyst and a second catalyst non-perovskite catalyst, the second catalyst non-perovskite catalyst have a loading of about 1-100 $g/ft^3$, 1-60 $g/ft^3$, 10-60 $g/ft^3$, 1-40 $g/ft^3$, 1-20 $g/ft^3$, or a loading within such ranges. In one embodiment of a catalyst combination comprising a second non- perovskite catalyst, the perovskite catalyst may have a loading ranging from 1 to 120 g/L, 1 to 80 g/L, 1 to 40 g/L, 1 to 20 g/L.

In one embodiment, a catalyst combination may include a perovskite catalyst and a second catalyst non-perovskite catalyst, wherein the second catalyst non-perovskite catalyst comprises platinum have a loading of about 1-60 $g/ft^3$, 1-40 $g/ft^3$, 1-20 $g/ft^3$, or a loading within such ranges. In one embodiment of a catalyst combination comprising platinum, the perovskite catalyst may have a loading ranging from 1 to 120 g/L, 1 to 80 g/L, 1 to 40 g/L, 1 to 20 g/L.

In one embodiment, a catalyst combination may include a perovskite catalyst and a second catalyst non-perovskite catalyst, wherein the second catalyst non-perovskite catalyst comprises palladium have a loading of about 5-100 $g/ft^3$, or 10-60 $g/ft^3$, or a loading within such ranges. In one embodiment of a catalyst combination comprising palladium, the perovskite catalyst may have a loading ranging from 1 to 120 g/L, 1 to 80 g/L, 1 to 40 g/L, 1 to 20 g/L.

One embodiment may include treatment of a gas stream that includes $NO_x$ with a perovskite catalyst having the general formula $ABO_3$, $AA'BO_3$ $ABB'O_3$, $AA'BB'O_3$, or $AA'BB'O_3$, in a catalytic oxidation reaction to oxidize nitric oxide in the gas stream.

In one embodiment, the perovskite catalyst of the general formula $ABO_3$ used in the oxidation reaction may be supported on any of a variety of substrates including, but not limed to, at least one of reactor packing structures and materials, beads, pellets, fluidized bed powders or other solid particulate material suspendable in a flow of gas, a flow-through monolith, a wall-flow monolith, a metal monolith, a ceramic monolith, metal or ceramic fabricated supports.

In one embodiment, the perovskite catalyst of the general formula $ABO_3$ used in the oxidation reaction may be not be supported by a substrate but may be formed into substrates having any of a variety of configurations including, but not limited to, flat panels, beads, pellets, or reactor packing material shapes.

In select embodiments, the addition of a second non-perovskite catalyst in a catalyst combination also including a perovskite catalyst improves the perovskite catalyst function. A catalyst combination comprising a perovskite catalyst and a non-perovskite catalyst may allow for oxidation of CO or unburned hydrocarbons in a gas stream. The addition of a second catalyst such as, but not limited to, platinum or palladium may improve NO oxidation and reduce low temperature fouling of the catalyst system. The use of a catalyst combination comprising a perovskite catalyst and a non-perovskite catalyst may improve NO oxidation with less precious metal catalyst being used compared to systems including only precious metal catalysts. In one embodiment, the catalyst combination may be coupled or coated on any of a variety of substrate or the catalyst combination may be formed into substrates. The catalyst combination comprising a perovskite catalyst and a non-perovskite catalyst may be used to treat any gas stream.

Referring now to FIG. 1, one embodiment is illustrated by a flow diagram of an exhaust system 10 for a lean burning hydrocarbon fueled power source 10. An exhaust stream 12 from the exhaust manifold of an engine operating at an air-to-fuel mass ratio well above the stoichiometric ratio is to be treated to reduce the $NO_x$ (mainly a mixture of NO and $NO_2$ with some $N_2O$) content to nitrogen ($N_2$). When the exhaust stream 12 is from a gasoline-fueled engine operated, for example, at an air to fuel ratio of greater than 17 (i.e. A/F>17), the exhaust gas contains some unburned hydrocarbons (HC), $NO_x$, carbon monoxide (CO), carbon dioxide ($CO_2$), water ($H_2O$), oxygen ($O_2$), and nitrogen ($N_2$). The fuel used may include, but is not limited to, gasoline and diesel fuel. The exhaust stream 12 from a diesel engine contains the same gaseous constituents plus suspended diesel particulates (composed of high molecular weight hydrocarbons deposited on carbon particles).

Such hydrocarbon containing exhaust streams 12 may be passed through a catalytic oxidation reactor 14, which substantially completes the oxidation of carbon monoxide to carbon dioxide and the oxidation of hydrocarbons to carbon dioxide and water. There is typically abundant oxygen in the exhaust gas stream 12 for these reactions.

The catalytic oxidation reactor 14, as shown best in FIG. 2, may include a traditional ceramic substrate material 50 such as cordierite coated with a washcoat 54, here shown as coating the rear side portion 18, that includes a perovskite catalyst of the general formula $ABO_3$, wherein A represents a rare earth metal from the Lanthanide Series and/or an alkaline-earth metal (La, Sr, Ce, Ba, Pr, Nd, or Gd) and wherein B represents a transition metal (Co, Ni, Cu, Zn, Cr, V, Pt, Pd, Rh, Ru, Ag, Au, Fe, Mn, or Ti).

But as stated above, the perovskite catalyst may be provided on a variety of substrates including, but not limed to, at least one of reactor packing structures and materials, beads, pellets, fluidized bed powders or other solid particulate material suspendable in a flow of gas, a flow-through monolith, a wall-flow monolith, a metal monolith, a ceramic monolith, metal or ceramic fabricated supports.

In one embodiment, the perovskite catalyst of the general formula $ABO_3$ used in the oxidation reaction may be formed into substrates of any of a variety of configurations including, but not limited to, flat panels, beads, pellets, flow-through or wall-flow monoliths, or reactor packing material shapes. Packing material shape may include, but are not limited to, rings, saddles, hollow cylinders or Raschig rings.

The perovskite catalyst primarily functions to oxidize nitric oxide (NO) to nitrogen dioxide ($NO_2$). Two exemplary perovskite catalysts of the general formula $ABO_3$ that may be utilized in the catalytic oxidation reactor 14 include $LaCoO_3$ and $LaMnO_3$.

In another exemplary embodiment, the catalytic performance of the perovskite catalyst of the general formula $ABO_3$ as described above may be enhanced by the substitution of a small amount of a promoter material for a portion of element A or element B in the catalytic formulation. Solid solutions of $ABO_3$ with $AA'BO_3$, $ABB'O_3$, or even $AA'BB'O_3$, may be utilized, wherein A' signifies a substitution of the promoter material for a portion of the A element, and wherein B' represents a substitution of the promoter material for a portion of the B element.

One illustrative promoter material is Strontium (Sr), and an exemplary formulation is $ASrBO_3$, wherein A and B are described as above. Two exemplary perovskite catalysts including the Strontium promoter material that may be utilized in the catalytic oxidation reactor 14 include $La_{1-x}Sr_x CoO_3$ and $La_{1-x}Sr_x MnO_3$.

Referring back to FIG. 2, a portion of the substrate material 50, here the front side portion 16, may be coated with a second washcoat 52 with platinum group metal (PGM) loading at about 5-150 $g/ft^3$ and may include platinum, palladium, a mixture of platinum and palladium, and other support materials. The second washcoat 52 may aid in oxidizing carbon monoxide to carbon dioxide and oxidizing hydrocarbons to carbon dioxide and water.

While the catalytic oxidation reactor 14 as shown in FIG. 2 includes a front side portion 16 including the second washcoat 52 and the rear side portion 18 including the first washcoat 54, other exemplary embodiments are specifically contemplated with other arrangements. For example, the entire substrate material 50 may be coated with both the first washcoat 54 and second washcoat 52, applied in consecutive steps or together in a single washcoat formulation. Alternatively, the entire substrate material 50 may be coated exclusively with the second washcoat 52 including the perovskite catalyst, depending upon the composition of the exhaust gas 12 and the desired treatment of the exhaust gas, and still fall within the spirit of the present invention.

Referring back to FIG. 1, ammonia ($NH_3$) or urea may also be added to exhaust stream 12 after the exhaust stream 12 exits the catalytic oxidation reactor 14. Ammonia can be stored in a suitable form (such as liquid ammonia or as urea) on-board a lean burn engine vehicle, or near-by a stationary engine, collectively referred to herein as an ammonia injector device 20, and may be added as a stream 22 to the exhaust stream 12 upstream of the catalytic reduction reactor 40 and the hydrocarbon particulate filter 45. The ammonia or urea from the stream 22 may participate in the reduction of nitric oxide (NO) and nitrogen dioxide ($NO_2$) to nitrogen ($N_2$).

The exhaust stream 12 treated with ammonia or urea then enters the catalytic reduction reactor 40. The catalytic reduction reactor 40 may include a selective catalytic reduction (SCR) catalyst 42 that functions primarily to substantially reduce NO and $NO_2$ (i.e. $NO_x$) to $N_2$ and water.

The SCR catalyst 42 may be formed from a washcoat (not shown) including a base metal as the active material contained in a zeolite material and other support materials (examples: Cu/ZSM-5, vanadia/titania etc.) coupled to a conventional substrate material such as cordierite. The base metal may aid in converting NO to $NO_2$ and subsequently converting $NO_2$ to $N_2$ and water which may be discharged through the tailpipe (not shown) as an emission.

Maximum reduction performance of the SCR catalyst 42 is often achieved at a substantially equimolar ratio (1:1 ratio) of NO and $NO_2$ in the exhaust stream 12, especially at lower temperatures (such as start up or warm up conditions) where the SCR catalyst 42 may not convert $NO_x$ to $N_2$ and water at its maximum efficiency. In addition, at the 1:1 ratio, the detrimental effects of high space velocity and SCR catalyst 42 aging may be minimized. As the engine-out $NO_x$ typically contains less than 10% $NO_2$, the oxidation catalyst 14 converts a portion of the engine-out NO to $NO_2$ to achieve a $NO/NO_2$ molar ratio closer to 1:1. When the temperature of the SCR catalyst 42, as measured by a temperature sensor 27, is sufficiently high (i.e. the temperature in which the SCR catalyst 42 may be operating at substantially peak efficiency to convert $NO_x$ regardless of exhaust gas 12 composition), the benefit of the equimolar $NO/NO_2$ ratio is diminished.

In order to achieve high $NH_3$ SCR efficiencies, the ratio of $NH_3$ to $NO_x$ must also be carefully maintained at close to 1:1. The ammonia or urea added from the injector device 20 to the exhaust stream 12 prior to entering the catalytic reduction reactor 40 therefore may be controlled to achieve this equimolar ratio. This control can be done by measuring the concentration of NOx in the exhaust stream using a $NO_x$ sensor 25 and controlling the amount of ammonia or urea injected from the injector device 20 as a function of the $NO_x$ measurement to achieve the desired 1:1 ratio.

Finally, the exhaust stream 12 flows through a particulate filter 45 to remove any remaining particulate matter and exits through a tailpipe (not shown) or similar type device to the atmosphere. In alternative exemplary arrangements, the particulate filter 45 may filter the exhaust stream 12 prior to entering the catalytic reduction reactor 40. The particulate filter 45 may be formed from various materials, including cordierite or silicone-carbide, which traps particulate matter.

Referring now to FIG. 3, a table is provided that compares the performance of various perovskite catalysts in accordance with the exemplary embodiments, in terms of the percentage of nitric oxide oxidation at 325 degrees Celsius, of the general formula $LaBO_3$ (B=Co or Mn) coupled to a conventional cordierite substrate material at various loadings (S.A. "Surface Area" refers to the specific surface area per unit mass of the catalytic materials), with and without a Strontium promoter, with commercially available platinum catalysts. The perovskite catalysts were prepared by the method described below in the Examples Section.

As shown in FIG. 3, the perovskite catalysts of the general formula $LaBO_3$ offered significant improvement of the oxidation of nitric oxide at 325 degrees Celsius as compared with the conventional platinum catalyst provided. Moreover, the addition of the Strontium promoter in increasing levels relative to Lanthanum, as exemplified by the general formula $La_{1-x}Sr_xBO_3$, appears to result in incremental improvements in nitric oxide oxidation as well.

FIG. 4 compares the performance of one exemplary perovskite catalyst including the Strontium promoter, $La_{0.9}Sr_{0.1}CoO_3$, versus a commercial platinum based catalyst, over a wide range of temperatures. The nitric oxide oxidation was confirmed by measuring the relative content of nitrogen dioxide in the $NO_x$ component of the exhaust stream at various temperatures. Here, the exhaust stream does not include water, carbon dioxide or hydrocarbons. The results confirm that $La_{0.9}Sr_{0.1}CoO_3$ appears to oxidize a greater portion of nitric oxide over a wide temperature range than a traditional platinum based catalyst.

Figure 5:
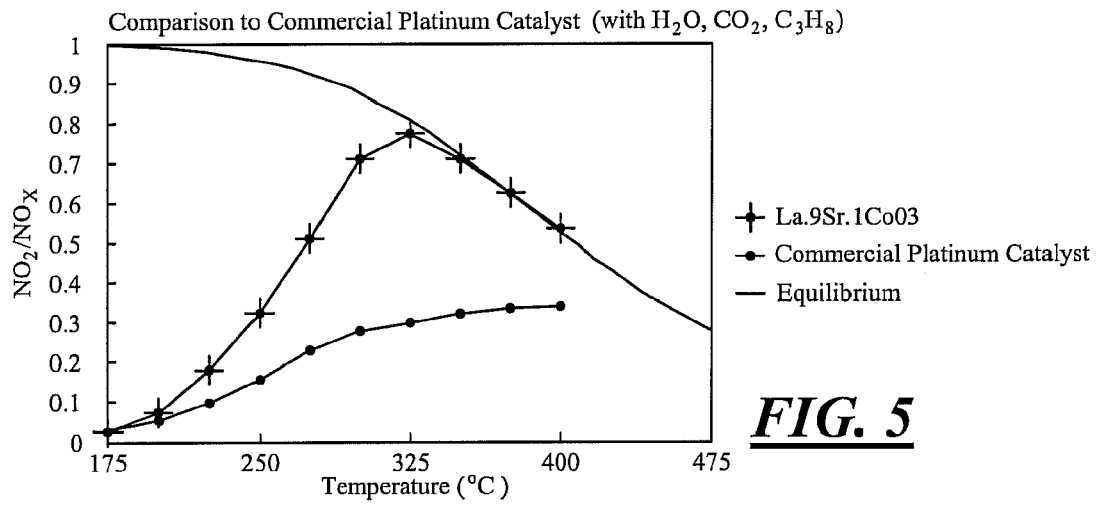
FIG. 5 is a graphical illustration of the nitric oxide oxidation performance of $La_{0.9}Sr_{0.1}CoO_3$ versus a commercial platinum catalyst over a wide range of temperatures.

FIG. 5 compares the performance of one exemplary perovskite catalyst including the Strontium promoter, $La_{0.9}Sr_{0.1}CoO_3$, versus a traditional platinum based catalyst, in terms of nitric oxide oxidation, over a wide range of temperatures in a typical lean exhaust stream containing water, carbon dioxide and hydrocarbons. The nitric oxide oxidation was confirmed by measuring the relative content of nitrogen dioxide in the $NO_x$ component of the exhaust stream at various temperatures. The results confirm that $La_{0.9}Sr_{0.1}CoO_3$ appears to oxidize a greater portion of nitric oxide in an exhaust stream including water, carbon dioxide and hydrocarbons over a wide temperature range.

Figure 6:
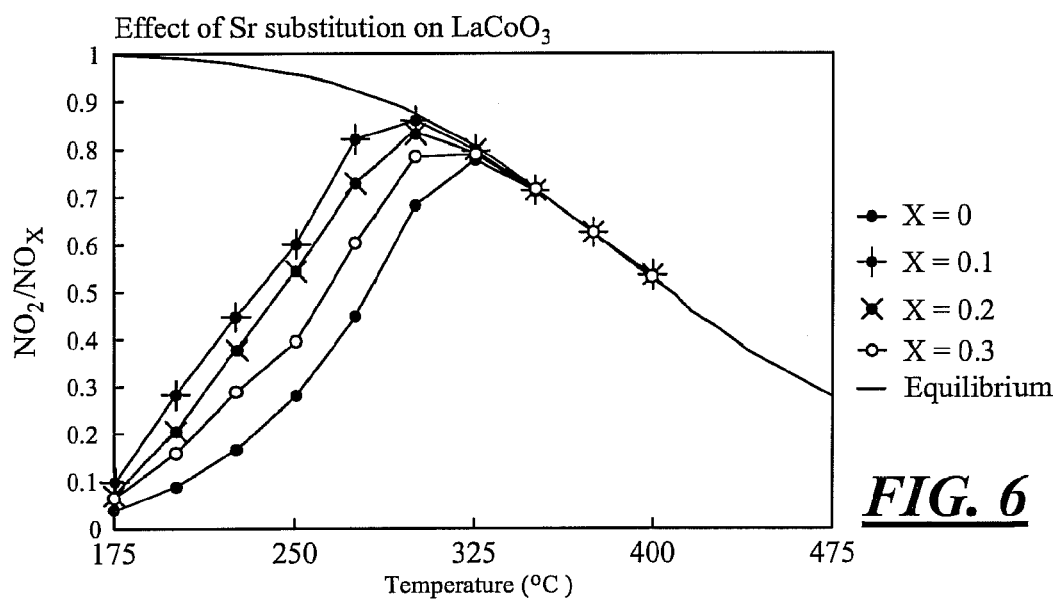
FIG. 6 is a graphical illustration of the nitric oxide oxidation performance of $La_{1-x}Sr_xCoO_3$ at various Sr loadings versus a commercial platinum catalyst over a wide range of temperatures.

FIG. 6 compares the performance of one exemplary perovskite catalyst, $La_{1-x}Sr_xCoO_3$ (x=0, 0.1, 0.2, 0.3), including the Strontium promoter, in terms of nitric oxide oxidation, over a wide range of temperatures in a typical lean exhaust stream containing water, carbon dioxide and hydrocarbons. FIG. 5 confirms that the addition of Strontium of as little as 10 molar percent of the Lanthanum component may improve the nitric oxide oxidation at various promoter levels as compared with the $LaCoO_3$.

The above description of embodiments of the invention is merely exemplary in nature and, thus, variations thereof are not to be regarded as a departure from the spirit and scope of the invention.

EXAMPLES

Catalyst Preparation $La_{1-x}Sr_xCoO_3$ (x=0, 0.1, 0.2, 0.3) and $La_{1-x}Sr_xMnO_3$ (x=0, 0.1) catalysts were prepared by citrate methods as shown in Table 1 below. In the methods, appropriate amounts of $La(NO_3)_3.6H_2O$, $Co(NO_3)_2.6H_2O$, $Mn(NO_3)_2$ solution, and $Sr(NO_3)_2$ were dissolved in distilled water with citric acid monohydrate. Citric acid was added in about a 10 weight percent excess to ensure complete complexation of the metal ions. The amount of water used was about 46.2 mL/g $La(NO_3)_3.6H_2O$. The solution was set on a stirring and heating plate and stirred for 1 hour, then heated to about 80 degrees Celsius under continued stirring.

TABLE 1

| | $LaCoO_3$ | $La_{0.9}Sr_{0.1}CoO_3$ | $LaMnO_3$ |
|---|---|---|---|
| $La(NO_3)_3 \cdot 6H_2O$ | 17.61 g | 35.62 g | 27.60 g |
| $Sr(NO_3)_2$ | — | 1.93 g | — |
| $Co(NO_3)_2 \cdot 6H_2O$ | 11.84 g | 26.60 g | — |
| $Mn(NO_3)_2$ | — | — | 14.14 g |
| $C_6H_8O_7 \cdot H_2O$ | 15.67 g | 34.51 g | 24.56 g |
| Deionized $H_2O$ | 825 ml | 1820 ml | 1275 ml |

During the preparation, water was evaporated until the solution became a viscous gel and just began evolving $NO_2$ gas. The gel was then placed overnight in an oven set at about 90 degrees Celsius. The resulting spongy material was crushed and calcined at about 700 degrees Celsius for about 5 hours in static air. The temperature was ramped at a rate of about 10 degrees Celsius per minute. When the temperature reached just below about 300 degrees Celsius, the citrate ions combusted vigorously, causing a larger spike in temperature and powder displacement. For this reason the powder was covered with several layers of $ZrO_2$ balls (the same as used for ball milling) to prevent powder displacement, but still allow gas mobility. After calcination, the powder was ball milled with about 6.33 mL water/g powder for about 24 hours. Afterward, the slurry was stirred continuously, and about 0.33 mL of 0.1 M $HNO_3$/g powder and about 5 mL water/g powder was added to the slurry. The resulting washcoat solution had a concentration of about 0.114 gram catalyst/mL solution.

A cordierite substrate was dipped in the washcoat solution and excess liquid removed, and the wet substrate was set horizontally in an oven set to about 200 degrees Celsius for about 30 minutes. This procedure was repeated until the desired loading was obtained. Finally, the catalyst was calcined at about 700 degrees Celsius for about 5 hours with an air flow of about 100 sccm.

What is claimed is:

1. A product comprising:
a catalyst combination comprising a perovskite catalyst and a second non-perovskite catalyst, the perovskite catalyst having the general formula $ABO_3$, $AA'BO_3$, $ABB'O_3$, or $AA'BB'O_3$, wherein A comprises a rare earth metal from the Lanthanide Series and/or an alkaline-earth metal and wherein B comprises a transition metal, and a particulate filter.

2. A product as set forth in claim 1, wherein said perovskite catalyst has the general formula $AA'BO_3$;
wherein A comprises a rare earth metal from the Lanthanide Series and/or an alkaline-earth metal;
wherein B comprises a transition metal; and
wherein A' comprises a substitution of a promoter material for a portion of A.

3. A product as set forth in of claim 2, wherein A' comprises Strontium.

4. A product as set forth in claim 1, wherein said perovskite catalyst has the general formula $ABB'O_3$,
wherein A comprises a rare earth metal from the Lanthanide Series and/or an alkaline-earth metal;
wherein B comprises a transition metal; and
wherein B' comprises a substitution of a promoter material for a portion of B.

5. A product as set forth in claim 1, wherein said perovskite catalyst has the general formula $AA'BB'O_3$,
wherein A comprises a rare earth metal from the Lanthanide Series and/or an alkaline-earth metal;
wherein B comprises a transition metal;
wherein A' comprises a substitution of a promoter material for a portion of A; and
wherein B' comprises a substitution of a promoter material for a portion of B.

6. A product as set forth in claim 1, wherein A is Lanthanum.

7. A product as set forth in claim 6, wherein B is Cobalt or Manganese or Iron.

8. A product as set forth in claim 1 further comprising a catalytic oxidation reactor and wherein the catalyst combination is received in the reactor, wherein the catalyst combination is coupled to a substrate comprising at least one of reactor packing structures and materials, beads, pellets, fluidized bed powders or other solid particulate material suspendable in a flow of gas, a flow-through monolith, a wall-flow monolith, a metal monolith, a ceramic monolith, metal or ceramic fabricated supports.

9. A product as set forth in claim 8 wherein the catalyst combination has a loading of about 1-100 g/ft$^3$.

10. A product as set forth in claim 8 wherein the second non-perovskite catalyst comprises palladium having a loading of 5-100 g/ft$^3$.

11. A product as set forth in claim 8 wherein the second non-perovskite catalyst comprises platinum having a loading of 1-60 g/ft$^3$.

12. A product as set forth in claim 1 further comprising a catalytic oxidation reactor and wherein the catalyst combination is received in the reactor, wherein the catalyst combination is not coupled to a substrate.

13. A product as set forth in claim 12 wherein the catalyst combination has a loading of about 1-100 g/ft$^3$.

14. A product as set forth in claim 1 further comprising a catalytic oxidation reactor and wherein the catalyst combination is received in the reactor, wherein the catalyst combination has a form or shape comprising at least one of flat panels, beads, pellets, flow-through or wall-flow monoliths, or reactor packing material shapes.

15. A product as set forth in claim 1 further comprising a catalytic oxidation reactor and wherein the catalyst combination is received in the reactor, wherein the catalyst combination has a form or shape comprising at least one of, rings, saddles, hollow cylinders or Raschig rings.

16. A product as set forth in claim 1 wherein the second non-perovskite catalyst comprises at least one metal from the precious metal or nobel metal group of the periodic table.

17. A product as set forth in claim 1 wherein the second non-perovskite catalyt comprises at least one of palladium, platinum, rhodium or ruthenium, or catalyst systems including the same.

18. A product as set forth in claim 1 wherein the second non-perovskite catalyst comprises at least one of palladium or platinum, or catalyst systems including the same.

19. A system for reducing $NO_x$ and particulate matter emissions in an exhaust stream comprising:
a catalytic oxidation reactor comprising a perovskite catalyst and a non-perovskite catalyst, the perovskite catalyst having the general formula $ABO_3$, $AA'BO_3$, $ABB'O_3$, or $AA'BB'O_3$, wherein A comprises a rare earth metal from the Lanthanide Series and/or an alkaline-earth metal and wherein B comprises a transition metal;
a particulate filter; and
a catalytic reduction reactor having a selective catalytic reduction catalyst.

20. The system of claim 19, wherein said perovskite catalyst said perovskite catalyst is of the general formula $AA'BO_3$;
wherein A comprises a rare earth metal from the Lanthanide Series and/or an alkaline-earth metal;
wherein B comprises a transition metal; and
wherein A' comprises a substitution of a promoter material for a portion of A.

21. A system as set forth in claim 19, wherein said perovskite catalyst said perovskite catalyst is of the general formula $ABB'O_3$;
wherein A comprises a rare earth metal from the Lanthanide Series and/or an alkaline-earth metal;
wherein B comprises a transition metal; and
wherein B' comprises a substitution of a promoter material for a portion of B.

22. A system as set forth in claim 19, wherein said perovskite catalyst said perovskite catalyst is of the general formula $AA'BB'O_3$;
wherein A comprises a rare earth metal from the Lanthanide Series and/or an alkaline-earth metal;
wherein B comprises a transition metal;
wherein A' comprises a substitution of a promoter material for a portion of A; and
wherein B' comprises a substitution of a promoter material for a portion of B.

23. A system as set forth in claim 19, wherein said catalytic oxidation reactor further comprises:
a platinum based catalyst or a palladium based catalyst or a platinum and palladium based catalyst coupled to another portion of said substrate material.

24. A system as set forth in claim 19, wherein said catalytic oxidation reactor further comprises:
a platinum based catalyst or a palladium based catalyst or a platinum and palladium based catalyst coupled to said portion of said substrate material.

25. A system as set forth in claim 19 further comprising:
an injector device for injecting ammonia or urea to the exhaust stream before said catalytic reduction reactor.

26. A system as set forth in claim 25 further comprising:
a $NO_x$ sensor contained within the exhaust stream and coupled to said injector device, said $NO_x$ sensor located upstream of said catalytic reduction reactor.

27. A system as set forth in claim 25 further comprising:
a temperature sensor coupled to said catalytic reduction reactor and said injector device, said temperature sensor measuring a temperature of a selective catalytic reduction catalyst contained in said catalytic reduction reactor.

28. A product as set forth in claim 19 wherein the second non-perovskite catalyst comprises palladium having a loading of 5-100 $g/ft^3$.

29. A product as set forth in claim 19 wherein the second non-perovskite catalyst comprises platinum having a loading of 1-60 $g/ft^3$.

30. A method for oxidizing nitric oxide in a gas stream from a hydrocarbon fueled power source operated with a fuel lean combustion mixture, the method comprising:
passing the gas stream through a catalytic oxidation reactor, the catalytic oxidation reactor comprising a perovskite catalyst and a non-perovskite catalyst, the perovskite catalyst having the general formula $ABO_3$, $AA'BO_3$ $AA'BB'O_3$, or $AA'BB'O_3$, wherein A comprises a rare earth metal from the Lanthanide Series and/or an alkaline-earth metal and wherein B comprises a transition metal, and a particulate filter.

31. A method as set forth in claim 30 further comprising:
forming a catalytic oxidation reactor comprising a perovskite catalyst has the general formula $AA'BO_3$ coupled to a substrate material, wherein A comprises a rare earth metal from the Lanthanide Series and/or an alkaline-earth metal, wherein B comprises a transition metal, and wherein A' comprises a substitution of a promoter material for a portion of A.

32. A method as set forth in 30 further comprising:
forming a catalytic oxidation reactor comprising a perovskite catalyst has the general formula $ABB'O_3$ coupled to a substrate material, wherein A comprises a rare earth metal from the Lanthanide Series and/or an alkaline-earth metal, wherein B comprises a transition metal, and wherein B' comprises a substitution of a promoter material for a portion of B.

33. A method as set forth in claim 30 further comprising:
forming a catalytic oxidation reactor comprising a perovskite catalyst has the general formula $AA'BB'O_3$ coupled to a substrate material, wherein A comprises a rare earth metal from the Lanthanide Series and/or an alkaline-earth metal, wherein B comprises a transition metal, wherein A' comprises a substitution of a promoter material for a portion of A, and wherein B' comprises a substitution of a promoter material for a portion of B.

34. A method as set forth in claim 30 wherein the perovskite catalyst is coupled to a substrate comprising at least one of reactor packing structures and materials, beads, pellets, fluidized bed powders or other solid particulate material suspendable in a flow of gas, a flow-through monolith, a wall-flow monolith, a metal monolith, a ceramic monolith, metal or ceramic fabricated supports.

35. A method as set forth in claim 30 wherein the perovskite catalyst is not coupled to a substrate.

36. A method as set forth in claim 30 wherein the perovskite catalyst includes a form or shape comprising at least one of flat panels, beads, pellets, flow-through or wall-flow monoliths, or reactor packing material shapes.

37. A method as set forth in claim 30 wherein the perovskite catalyst includes a form or shape comprising at least one of, rings, saddles, hollow cylinders or Raschig rings.

38. A product comprising:
a catalyst combination comprising a perovskite catalyst and a second non-perovskite catalyst, the perovskite catalyst having the general formula $ABO_3$, $AA'BO_3$ $ABB'O_3$, or $AA'BB'O_3$, wherein A comprises a rare earth metal from the Lanthanide Series and/or an alkaline-earth metal and wherein B comprises a transition metal, and further comprising a catalytic oxidation reactor and wherein the catalyst combination is received in the reactor, wherein the catalyst combination has a form or shape comprising at least one of, rings, saddles, hollow cylinders or Raschig rings.

39. A product comprising:
a catalyst combination comprising a perovskite catalyst and a second non-perovskite catalyst, wherein said perovskite catalyst has the general formula $AA'BO_3$;
wherein A comprises a rare earth metal from the Lanthanide Series and/or an alkaline-earth metal;
wherein B comprises a transition metal; and
wherein A' comprises a substitution of a promoter material for a portion of A.

40. A method as set forth in 39, further comprising:
forming a catalytic oxidation reactor comprising a perovskite catalyst has the general formula $ABB'O_3$ coupled to a substrate material, wherein A comprises a rare earth metal from the Lanthanide Series and/or an alkaline-earth metal, wherein B comprises a transition metal, and wherein B' comprises a substitution of a promoter material for a portion of B.

41. A method for oxidizing nitric oxide in a gas stream from a hydrocarbon fueled power source operated with a fuel lean combustion mixture, the method comprising:
passing the gas stream through a catalytic oxidation reactor, the catalytic oxidation reactor comprising a perovskite catalyst and a non-perovskite catalyst, the perovskite catalyst having the general formula $AA'BO_3$ wherein A comprises a rare earth metal from the Lanthanide Series and/or an alkaline-earth metal and wherein B comprises a transition metal, and wherein A' comprises a substitution of a promoter material for a portion of A.

42. A product comprising:
a substrate having a first catalyst washcoat thereon and a second catalyst washcoat thereon, the first catalyst washcoat comprising a perovskite catalyst, the second catalyst comprising a second non-perovskite catalyst, the perovskite catalyst having the general formula $ABO_3$, $AA'BO_3$, or $AA'BB'O_3$, wherein A comprises a rare earth metal from the Lanthanide Series and/or an alkaline-earth metal and wherein B comprises a transition metal.

* * * * *